(12) United States Patent
Okanoue et al.

(10) Patent No.: US 6,643,339 B1
(45) Date of Patent: Nov. 4, 2003

(54) RECEIVER AND RECEIVING METHOD

(75) Inventors: Kazuhiro Okanoue, Tokyo (JP);
Takeshi Yamamoto, Tokyo (JP);
Tomoki Osawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/496,160

(22) Filed: Feb. 1, 2000

(30) Foreign Application Priority Data

Feb. 4, 1999 (JP) .......................................... 11-027905

(51) Int. Cl.[7] .......................... H04B 1/10; H04B 17/02; H04J 11/00; H04L 27/06
(52) U.S. Cl. ..................... 375/349; 375/226; 375/231; 375/316; 375/346; 375/355; 375/371; 370/206; 455/139
(58) Field of Search ................................ 375/349, 346, 375/316, 231, 226, 355, 371, 375; 370/206; 455/139

(56) References Cited

U.S. PATENT DOCUMENTS

| 5,489,879 | A |   | 2/1996  | English |         |
|-----------|---|---|---------|---------|---------|
| 5,602,835 | A | * | 2/1997  | Seki et al. | 370/206 |
| 5,745,535 | A |   | 4/1998  | Mori    |         |
| 5,970,397 | A | * | 10/1999 | Klank et al. | 455/139 |
| 6,185,251 | B1| * | 2/2001  | Fertner | 375/231 |
| 6,246,717 | B1| * | 6/2001  | Chen et al. | 375/226 |

FOREIGN PATENT DOCUMENTS

JP          7-95174          4/1995

OTHER PUBLICATIONS

Canadian Office Action dated Sep. 25, 2002.

* cited by examiner

Primary Examiner—Stephen Chin
Assistant Examiner—Sam K. Ahn
(74) Attorney, Agent, or Firm—Dickstein, Shapiro, Morin & Oshinsky, LLP.

(57) ABSTRACT

K sub-carrier components from an FFT circuit 101 are output to a sub-carrier demodulating circuit 102. The sub-carrier demodulating circuit 102 demodulates the k sub-carrier components and outputs a transmitted information bit to an output terminal 104. Further, the sub-carrier demodulating circuit 102 outputs distortion correction coefficients $C(1)-C(k)$ that are used during demodulation of each sub-carrier, each of sub-carrier components $S(1)-S(k)$ in which distortion is corrected, and determination signal points $R(1)-R(k)$ for each sub-carrier to a phase estimating circuit 103. The phase estimating circuit 103 receives $C(1)-C(k)$, $R(1)-R(k)$ and $S(1)-S(k)$, and outputs a phase error signal to an output terminal 105. The phase error signal output to the output terminal 105 is integrated by a loop filter and so forth, and is fed back to a local oscillator, and thereby, phase tracking is conducted.

17 Claims, 11 Drawing Sheets

FIG. 13
PRIOR ART

RECEIVER AND RECEIVING METHOD

BACKGROUND OF THE INVENTION

The present invention relates to a receiver capable of adaptively taking phase synchronization with high accuracy for a modulated signal in which sub-carriers are multiplexed, such as an OFDM (Orthogonal Frequency Division Multiplexing) system.

Figure 13:
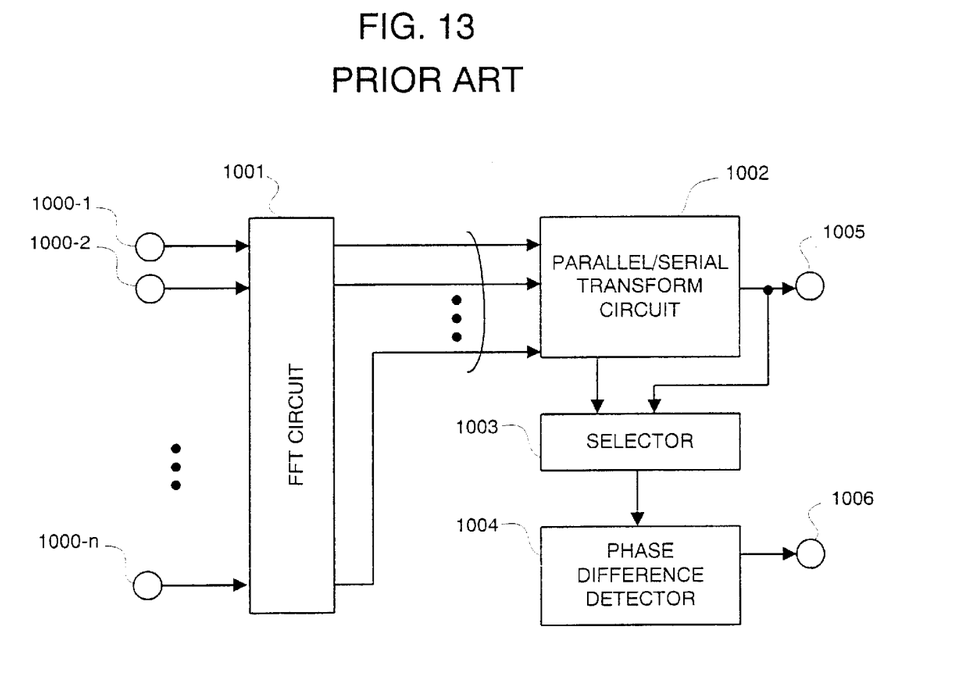
FIG. 13 is a block diagram of a receiver having a conventional phase tracking function.

One example of this kind of conventional receiver is described in JP-A-95174/1995. FIG. 13 is a block diagram of its apparatus for demodulating an OFDM signal. This apparatus detects a phase difference from a modulation result of an arbitrary carrier in order to conduct phase synchronization for a modulated signal in which sub-carriers are multiplexed.

In FIG. 13, 1000-1–1000-n are input terminals, 1001 is a fast Fourier transform (FFT) circuit of n points, 1002 is a parallel/serial transform circuit, 1003 is a selector, 1004 is a phase difference detector, and 1005 and 1006 are output terminals.

Serial/parallel transformed n received signals are input to the FFT circuit 1001 of n points through the input terminals 1000-1–1000-n. The FFT circuit 1001 applies Fourier transformation to the input signals and de-multiplexes sub-carriers therefrom, and inputs the sub-carriers to the parallel/serial transform circuit 1002.

The parallel/serial transform circuit 1002 applies parallel/serial transform to each of the input sub-carrier components and outputs it to the output terminal 1005, and also, outputs it to the selector 1004. Furthermore, the parallel/serial transform circuit 1002 outputs to the selector 1003 a pulse for indicating time when each subcarrier component is output.

The selector 1003 selects a sub-carrier component to be input, based on the input pulse, and outputs it to the phase difference detecting circuit 1004.

In the phase difference detecting circuit 1004, assuming that a phase of a symbol under ideal condition in which phase synchronization is established is a reference phase, a difference between the input sub-carrier component and the reference phase is detected as a phase error, and it is output to the output terminal 1006. The phase error output to the output terminal 1006 is integrated by a loop filter and so forth, and is fed back to a local oscillator.

However, in the above-mentioned conventional OFDM signal demodulating apparatus, there is a task that it becomes to be difficult to detect a correct phase difference when distortion occurs in the selected sub-carrier component due to disturbance such as a noise in a communication line.

Also, in JP-A-95174/1995, although it is suggested to adaptively select a sub-carrier based on a noise and distortion, a method and an arrangement therefor are not disclosed.

SUMMARY OF THE INVENTION

The present invention is made to solve the above-mentioned problems.

Moreover, the objective of the invention is to provide a receiver for receiving a modulated wave in which a plurality of sub-carriers are multiplexed, to provide the receiver for conducting phase tracking with high accuracy, and capable of obtaining high reception characteristic.

In a receiver for receiving a modulated wave for carrying a data in which N sub-carriers are multiplexed, the receiver of the first present invention has a sub-carrier demodulating circuit for receiving the above-described plurality of (k, $1 \leq k \leq N$) sub-carrier components which are multiplexed and de-multiplexed, and outputting a result of demodulating each of the above-described sub-carrier components as a demodulation result of each of the above-described plurality of sub-carrier components, and for conducting determination based on the above-described demodulation result and outputting a determination result, and also, outputting a distortion correction coefficient for each of the above-described plurality of sub-carrier components, and a value which is generated by correcting each of the above-described plurality of sub-carrier components based on the above-described distortion correction coefficient, and a phase estimating circuit for receiving the determination result of each of the above-described plurality of sub-carrier components, the distortion correction coefficient for each of the above-described plurality of sub-carrier components, and the value which is generated by correcting each of the above-described plurality of sub-carrier components based on the above-described distortion correction coefficient, and for outputting a phase error.

For example, the phase estimating circuit of the first present invention has k phase comparison circuits for receiving the determination result of each of the above-described plurality of sub-carrier components and the value which is generated by correcting each of the above-described plurality of sub-carrier components based on the above-described distortion correction coefficient, and for detecting a phase difference between the above-described corresponding demodulation result and the value corrected based on the above-described distortion correction coefficient, and outputting it as a phase difference of each sub-carrier, k electric power detecting circuits for receiving the distortion correction coefficient for each of the above-described plurality of sub-carrier components, detecting electric power of the distortion correction coefficient for each of the above-described plurality of sub-carrier components, and outputting it as distortion correction coefficient electric power of each sub-carrier, k weight setting circuits for receiving each distortion correction coefficient electric power of the above-described each sub-carrier, and based on the distortion correction coefficient electric power of the above-described each sub-carrier, for obtaining a weight for the above-described each sub-carrier for weighting a phase difference of the above-described each sub-carrier and conducting synthesis thereof, and outputting the weight, and a weighting and synthesizing circuit for outputting a result of weighting and synthesizing a phase difference of the above-described each sub-carrier based on the weight for the above-described each sub-carrier as a phase error.

For example, the above-described weight setting circuits of the first present invention make a weight for weighting to be large if the distortion correction coefficient electric power of the above-described each sub-carrier is small, and make a weight for weighting to be small if the distortion correction coefficient electric power of the above-described each sub-carrier is large.

For example, the above-described weight setting circuits of the first present invention set a weight to be 1 if the distortion correction coefficient electric power of the above-described each sub-carrier is smaller than a determined threshold value, and set a weight to be 0 if the distortion correction coefficient electric power of the above-described each sub-carrier is larger than a determined threshold value.

In a receiver for receiving a modulated wave for carrying a data in which N sub-carriers are multiplexed, the receiver of the second present invention has a sub-carrier demodulating circuit for receiving the above-described plurality of (k, 1≦k≦N) sub-carrier components which are multiplexed and de-multiplexed, and outputting a result of demodulating each of the above-described sub-carrier components as a demodulation result of each of the above-described plurality of sub-carrier components, and for conducting determination based on the above-described demodulation result and outputting a determination result, and outputting a value which is obtained by correcting distortion generated in each of the above-described plurality of sub-carrier components, and a phase estimating circuit for receiving the determination result of each of the above-described plurality of sub-carrier components, the value which is obtained by correcting distortion generated in each of the above-described plurality of sub-carrier components, and the above-described plurality of sub-carrier components which are multiplexed and de-multiplexed, and for outputting a phase error.

For example, the phase estimating circuit of the second present invention has k phase comparison circuits for receiving the determination result of each of the above-described plurality of sub-carrier components and the value which is obtained by correcting distortion generated in each of the above-described plurality of sub-carrier components, detecting the above-described corresponding demodulation result and the value which is obtained by correcting distortion generated in each of the above-described plurality of sub-carrier components, and outputting them as a phase difference of each sub-carrier, k electric power detecting circuits for receiving the above-described plurality of sub-carrier components which are multiplexed and de-multiplexed, detecting electric power of the above-described plurality of sub-carrier, components which are multiplexed and de-multiplexed, and outputting it as electric power of each sub-carrier component, k weight setting circuits for receiving each electric power of the above-described each sub-carrier component, and based on the electric power of the above-described each sub-carrier component, for obtaining a weight for the above-described each sub-carrier for weighting a phase difference of the above-described each sub-carrier and conducting synthesis thereof, and outputting the weight, and a weighting and synthesizing circuit for outputting a result of weighting and synthesizing a phase difference of the above-described each sub-carrier based on the weight for the above-described each sub-carrier as a phase error.

For example, the weight setting circuits of the second present invention make a weight for weighting to be small if the electric power of the above-described each sub-carrier component is small, and make a weight for weighting to be large if the electric power of the above-described each sub-carrier component is large.

For example, the weight setting circuits of the second present invention set a weight to be 0 if the electric power of the above-described each sub-carrier component is smaller than a determined threshold value, and set a weight to be 1 if the electric power of the above-described each sub-carrier component is larger than a determined threshold value.

In a receiving method of receiving a modulated wave for carrying a data in which N sub-carriers are multiplexed, said receiving method comprises the steps of:

receiving a plurality of (k, 1≦k≦N) sub-carrier components which are multiplexed and de-multiplexed, and outputting a result of demodulating each of said sub-carrier components as a demodulation result of each of said plurality of sub-carrier components, conducting determination based on said demodulation result and outputting a determination result, and outputting a distortion correction coefficient for each of said plurality of sub-carrier components, and a value which is generated by correcting each of said plurality of sub-carrier components based on said distortion correction coefficient; and estimating a phase error based on said determination result of each of said plurality of sub-carrier components, said distortion correction coefficient for each of said plurality of sub-carrier components and said value which is generated by correcting each of said plurality of sub-carrier components based on said distortion correction coefficient.

In the receiving method, wherein said step of estimating a phase error comprises the steps of:

receiving the determination result of each of said plurality of sub-carrier components and the value which is generated by correcting each of said plurality of sub-carrier components based on said distortion correction coefficient, and for detecting a phase difference between said corresponding demodulation result and the value corrected based on said distortion correction coefficient, and outputting it as a phase difference of each sub-carrier;

receiving the distortion correction coefficient for each of said plurality of sub-carrier components, detecting electric power of the distortion correction coefficient for each of said plurality of sub-carrier components, and outputting it as distortion correction coefficient electric power of each sub-carrier;

receiving each distortion correction coefficient electric power of said each sub-carrier, and based on the distortion correction coefficient electric power of said each sub-carrier, for obtaining a weight for said each sub-carrier for weighting a phase difference of said each sub-carrier and conducting synthesis thereof, and outputting the weight; and outputting a result of weighting and synthesizing a phase difference of said each sub-carrier based on the weight for said each sub-carrier as a phase error.

In the receiving method, wherein said step of obtaining a weight make a weight for weighting to be large if the distortion correction coefficient electric power of said each sub-carrier is small, and make a weight for weighting to be small if the distortion correction coefficient electric power of said each sub-carrier is large.

In the receiving method, wherein said step of obtaining a weight set a weight to be 1 if the distortion correction coefficient electric power of said each sub-carrier is smaller than a determined threshold value, and set a weight to be 0 if the distortion correction coefficient electric power of said each sub-carrier is larger than a determined threshold value.

In a receiving method of receiving a modulated wave for transmitting a data in which N sub-carriers are multiplexed, said receiving method comprises the steps of:

receiving a plurality of (k, 1≦k≦N) sub-carrier components which are multiplexed and de-multiplexed, and outputting a result of demodulating each of said sub-carrier components as a demodulation result of each of said plurality of sub-carrier components, conducting determination based on said demodulation result and outputting a determination result, and outputting a value which is obtained by correcting distortion generated in each of said plurality of sub-carrier components; and estimating a phase error based on said demodulation result of each of said plurality of sub-carrier components, said value which is obtained by correcting distortion generated in each of said plurality of sub-carrier components and said plurality of sub-carrier components which are multiplexed and de-multiplexed.

In the receiving method, wherein said step of estimating phase error comprises the steps of:

receiving the determination result of each of said plurality of sub-carrier components and the value which is obtained by correcting distortion generated in each of said plurality of sub-carrier components, detecting said corresponding demodulation result and the value which is obtained by correcting distortion generated in each of said plurality of sub-carrier components, and outputting them as a phase difference of each sub-carrier;

receiving said plurality of sub-carrier components which are multiplexed and de-multiplexed, detecting electric power of said plurality of sub-carrier components which are multiplexed and de-multiplexed, and outputting it as electric power of each sub-carrier component;

receiving each electric power of said each sub-carrier component, and based on the electric power of said each sub-carrier component, for obtaining a weight for said each sub-carrier for weighting a phase difference of said each sub-carrier and conducting synthesis thereof, and outputting the weight; and outputting a result of weighting and synthesizing a phase difference of said each sub-carrier based on the weight for said each sub-carrier as a phase error.

In the receiving method, wherein said step of obtaining a weight make a weight for weighting to be small if the electric power of said each sub-carrier component is small, and make a weight for weighting to be large if the electric power of said each sub-carrier component is large.

In the receiving method, wherein said step of obtaining a weight set a weight to be 0 if the electric power of said each sub-carrier component is smaller than a determined threshold value, and set a weight to be 1 if the electric power of said each sub-carrier component is larger than a determined threshold value.

In the present invention, weighting based on a coefficient for correcting distortion generated in each sub-carrier is conducted for a demodulation result of each sub-carrier and a phase error of determination signal points. For example, a distortion correction coefficient for a sub-carrier in which large attenuation distortion occurs in a communication line becomes to be a large value so as to correct the attenuation distortion. On the other hand, a correction coefficient for a sub-carrier component in which distortion does not occur in a communication line becomes to be a value close to 1.

In this manner, by conducting the weighting for a phase error of each sub-carrier, which is proportional to an inverse number of a distortion correction coefficient, influence of a noise is suppressed, and the present invention is equivalent to adaptively selecting a sub-carrier in which a noise component is less and to conducting phase synchronization.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Embodiments of the present invention will be explained by referring to drawings.

Figure 1:
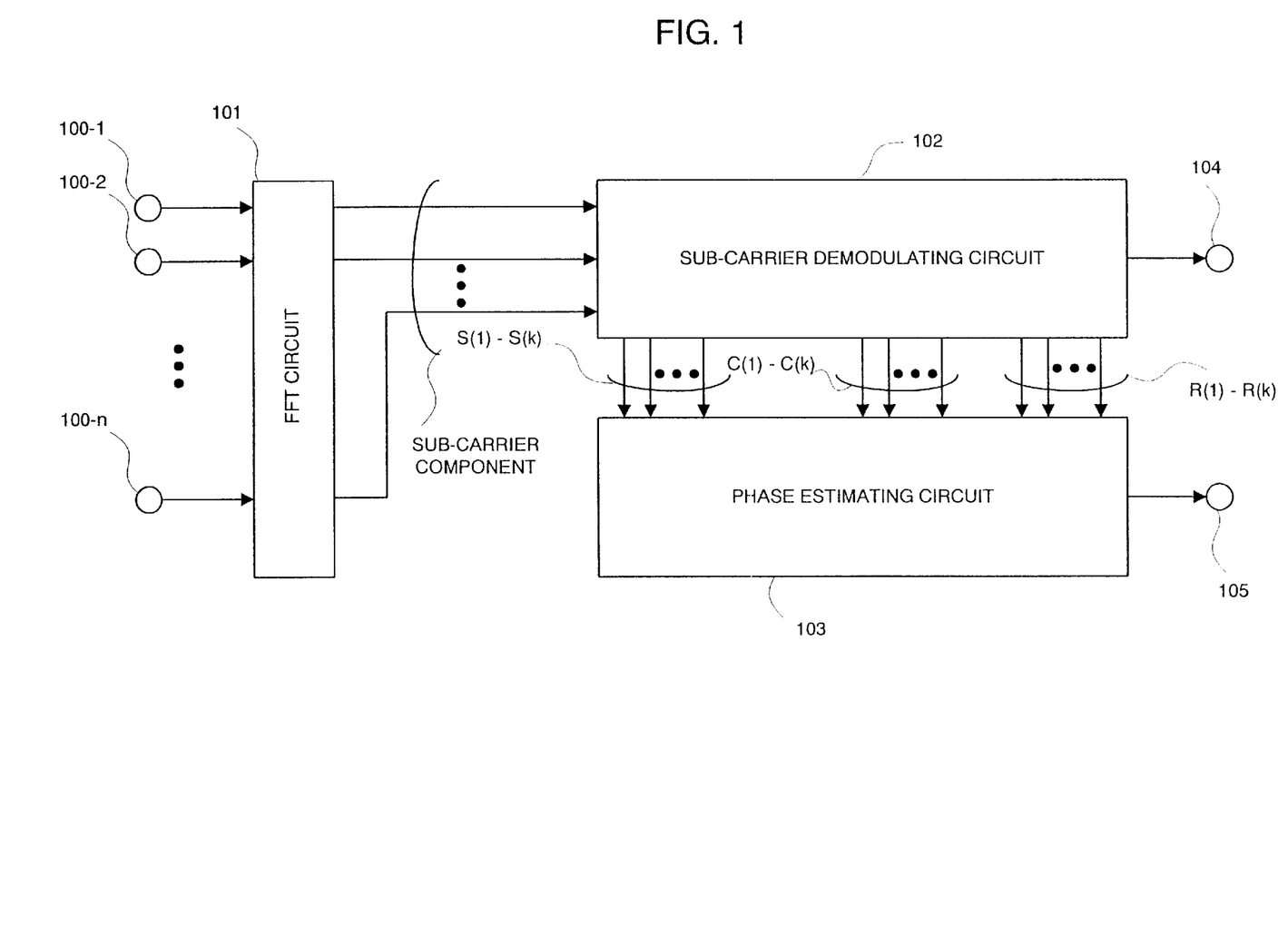
FIG. 1 is a block diagram showing an embodiment of a receiver of the first present invention.

FIG. 1 is a block diagram showing an embodiment in which the present invention is applied to packet communication. In FIG. 1, 100-1–100-n are input terminals, 101 is a fast Fourier transform (FFT) circuit, 102 is a sub-carrier demodulating circuit circuit, 103 is a phase estimating circuit, and 104 and 105 are output terminals. Here, the FFT circuit 101 conducts n points Fourier transform.

Figure 7:
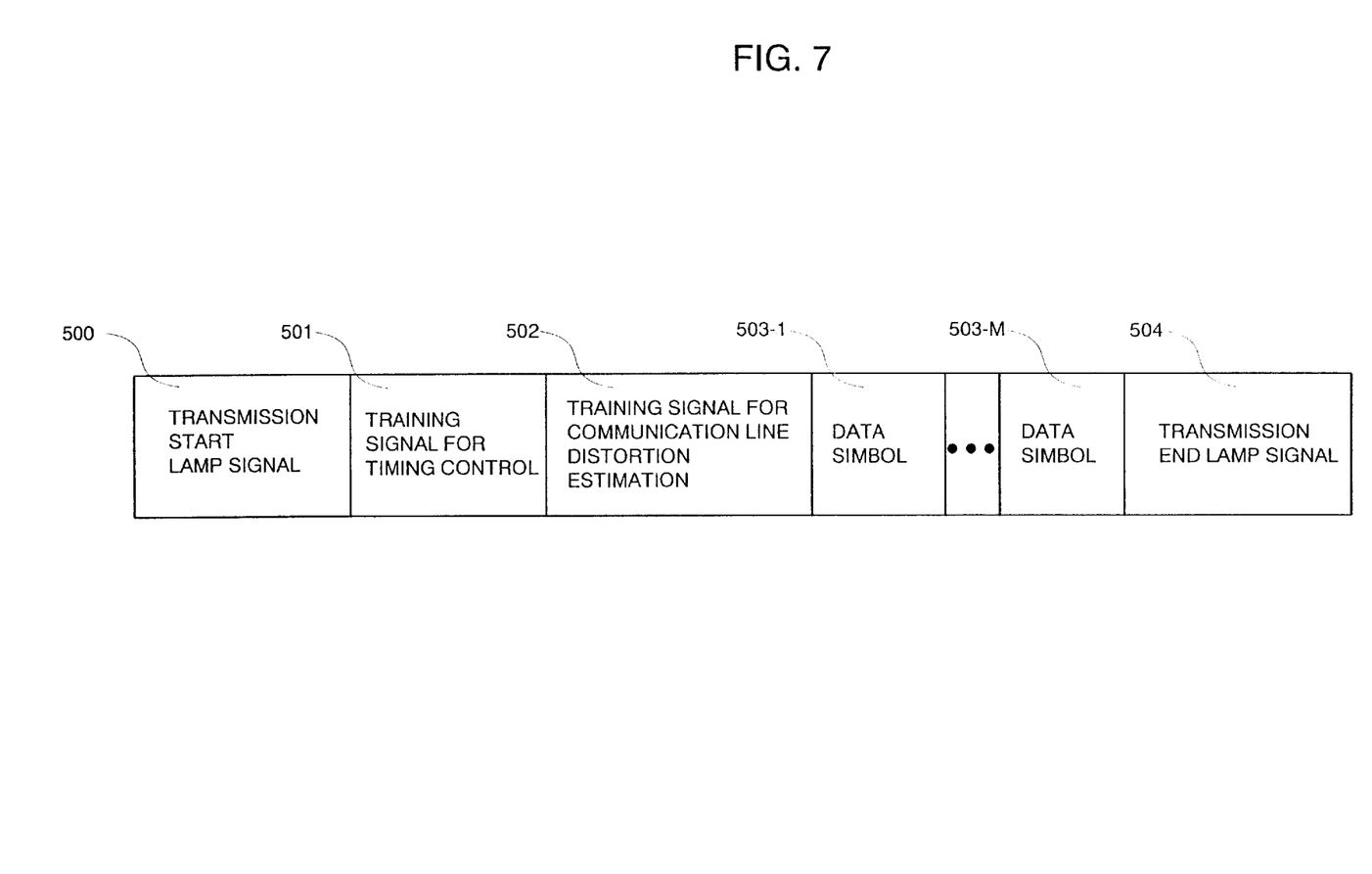
FIG. 7 is a view showing an example of a packet format that is input to the receiver of the present invention.

Also, as an example of a transmission packet having M data symbols, an arrangement shown in FIG. 7 is used. As shown in FIG. 7, this transmission packet has a transmission start lamp signal 500 for indicating a transmission start, a training signal 501 for timing control, a training signal 502 for communication line distortion estimation, M data symbols 503-1–503-M, and a transmission end lamp signal 504 for indicating a transmission end.

The packet of FIG. 7, which is constructed of an OFDM modulated symbol in which N sub-carriers are multiplexed, is serial/parallel-transformed for every n (N≦n) samples after sampling, and is input to the FFT circuit 101 through the input terminals 100-1–100-n. In the FFT circuit 101, Fourier-transform is applied to an input signal, and k (1≦k≦N) sub-carrier components are output. The k sub-carrier components output from the FFT circuit 101 are output to the sub-carrier demodulating circuit 102.

The sub-carrier demodulating circuit 102 demodulates the k sub-carrier components and determines a demodulation result, and outputs a signal for any of determination signal points R(1)–R(k). Further, based on the determined determination signal points R(1)–R(k), serial/parallel transform is applied to a transmitted information bit, and it is output to the output terminal 104. Furthermore, the sub-carrier demodulating circuit 102 outputs distortion correction coefficients C(1)–C(k) that are used during demodulation of each sub-carrier, each of sub-carrier components S(1)–S(k) in which distortion is corrected, and the determination signal points R(1)–R(k) for each sub-carrier to the phase estimating circuit 103.

The phase estimating circuit 103 receives the distortion compensation coefficients C(1)–C(k) for each sub-carrier, the determination signal points R(1)–R(k), and each of the sub-carrier components S(1)–S(k) in which distortion is corrected, which are obtained from the sub-carrier demodulating circuit 102, and outputs a phase error signal to the output terminal 105.

The phase error signal output to the output terminal 105 is integrated by a loop filter and so forth, and is fed back to a local oscillator, and thereby, phase tracking is realized.

Figure 2:
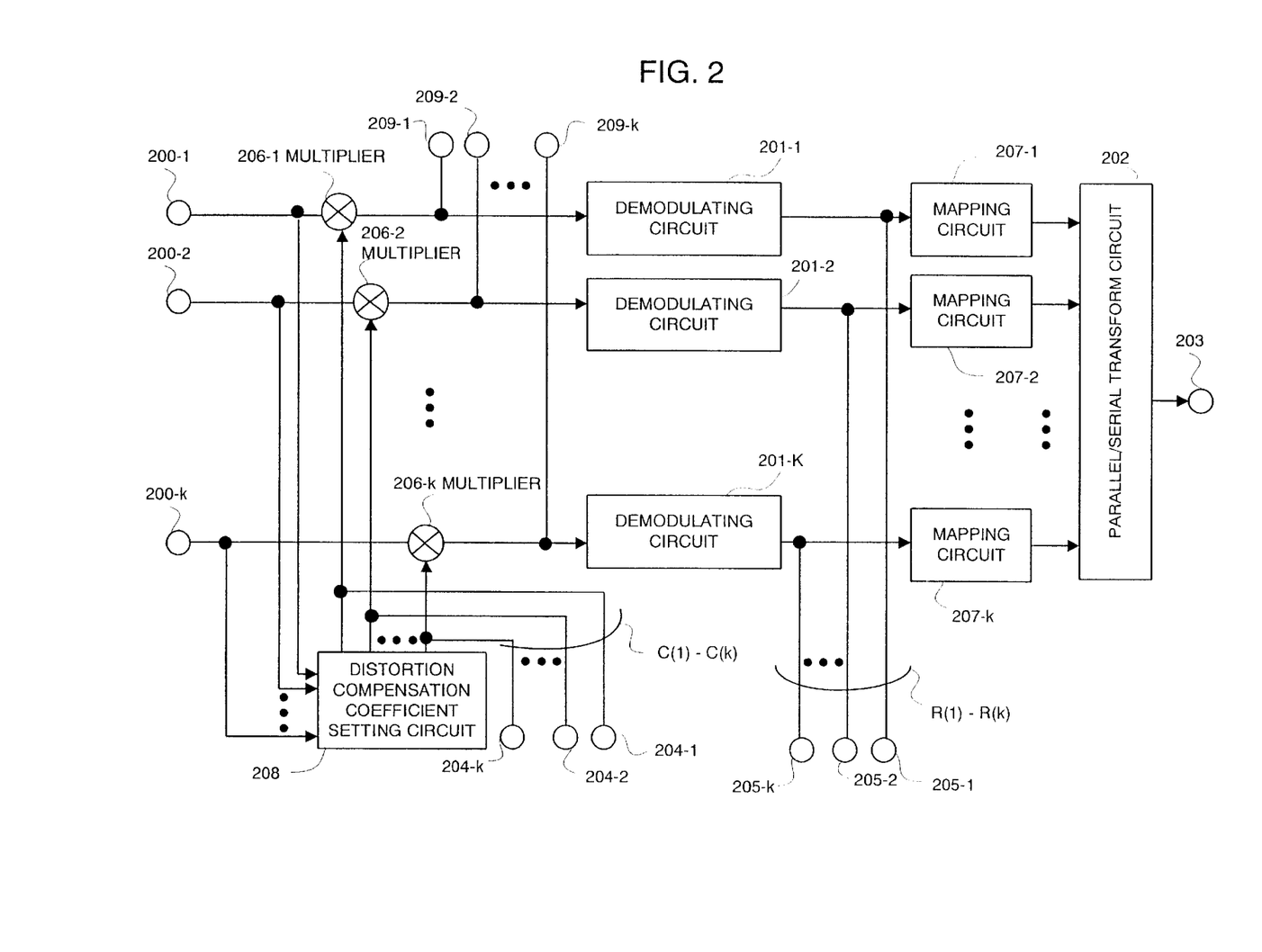
FIG. 2 is a block diagram showing an embodiment of the sub-carrier demodulating circuit 102 in FIG. 1.

The sub-carrier demodulating circuit 102 can be constructed as FIG. 2, for example. In FIG. 2, 200-1–200-k are input terminals, 201-1–201-k are demodulating circuits, 202 is a parallel-serial transform circuit, 206-1–206-k are multipliers, 207-1–207-k are mapping circuits, 208 is a distortion compensation coefficient setting circuit, and 203, 204-1–204-k, 205-1–205-k and 209-1–209-k are output terminals. The k sub-carrier components output from the FFT circuit 101 are input to the input terminals 200-1–200-k.

Out of the packet of a format shown in FIG. 7, a part of the training signal 502 for communication line distortion estimation is input to the distortion compensation coefficient setting circuit 208, and the distortion compensation coefficients C(1)–C(k) for each sub-carrier are obtained. The distortion compensation coefficients C(1)–C(k) are output to a group of the multipliers 204-1–204-k. Further, by means of the group of the multipliers 206-1–206-k, the distortion compensation coefficients C(1)–C(k) are multiplied by each sub-carrier which forms each symbol of the data symbols 503-1–503-M received after the distortion compensation coefficients C(1)–C(k) are obtained, and distortion which occurs in a communication line is compensated.

An output from each of the multipliers 206-1–206-k is output to the output terminals 209-1–209-k as the corrected sub-carrier components S(1)–S(k). Further, outputs from the group of the multipliers 206-1–206-k are demodulated to any of the transmission signal points, respectively, by a group of the demodulating circuits 201-1–201-k.

The signal points R(1)–R(k) corresponding to each sub-carrier component, which are output from the demodulating circuits 201-1–201-k, are output to a group of the output terminals 205-1–205-k, and also, to a group of the mapping circuits 207-1–207-k. The group of the mapping circuits 207-1–207-k apply mapping to the respective input signal points along a bit line corresponding to the signal points, and output them to the parallel-serial transform circuit 202. In the parallel/serial transform circuit 202, parallel/serial transform is applied to the bit line from the mapping circuits 207-1–207-k, and it is output to the output terminal 203 as a demodulation result.

Figure 3:
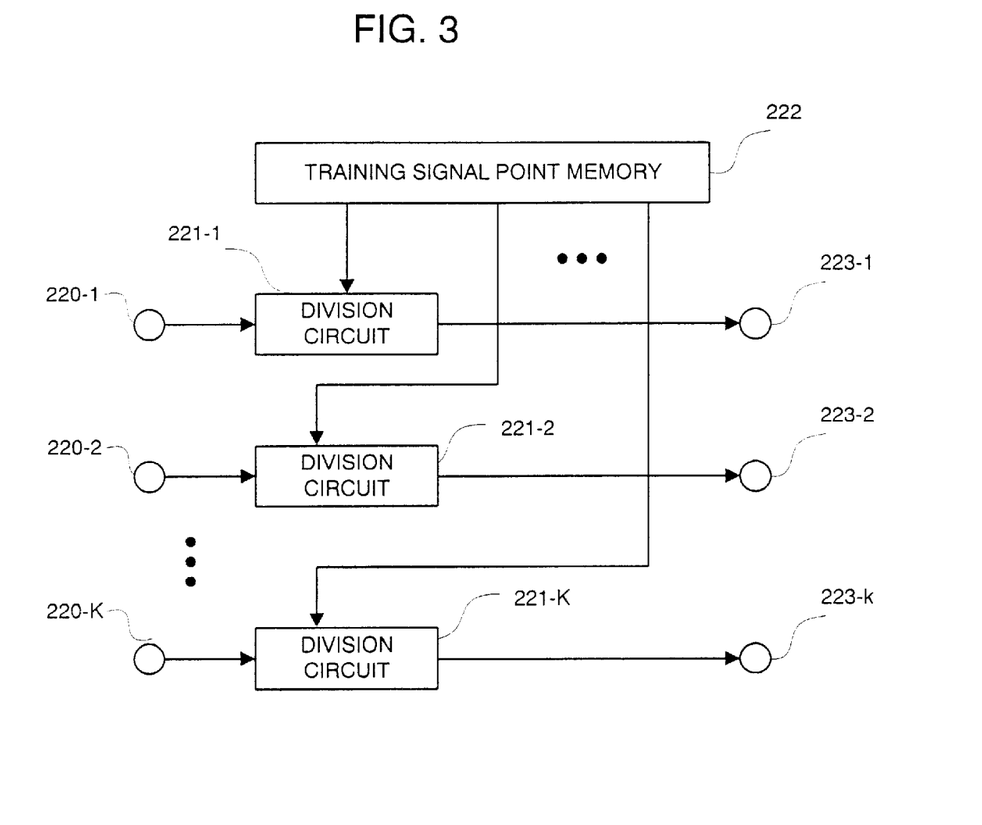
FIG. 3 is a block diagram showing an embodiment of the distortion compensation coefficient setting circuit 208 in FIG. 1.

Also, the distortion correction coefficient setting circuit 208 can be constructed as FIG. 3, for example. In FIG. 3, 220-1–220-k are input terminals, 221-1–221-k are division circuits, 222 is a training signal point memory, and 223-1–223-k are output terminals. The k sub-carrier components that form the training signal 502 for communication line distortion estimation are input to the input terminals 220-1–220-k. The division circuits 221-1–221-k divide the signal points of each sub-carrier that forms the training signal 502 for communication line distortion-estimation at a received signal point of each sub-carrier, which are stored in the corresponding training signal point memory 222, respectively. These division results become to be values for correcting communication line distortion for each sub-carrier component. These values are output to the output terminals 223-1–223-k as the distortion correction coefficients C(1)–C(k) for each sub-carrier component.

Figure 4:
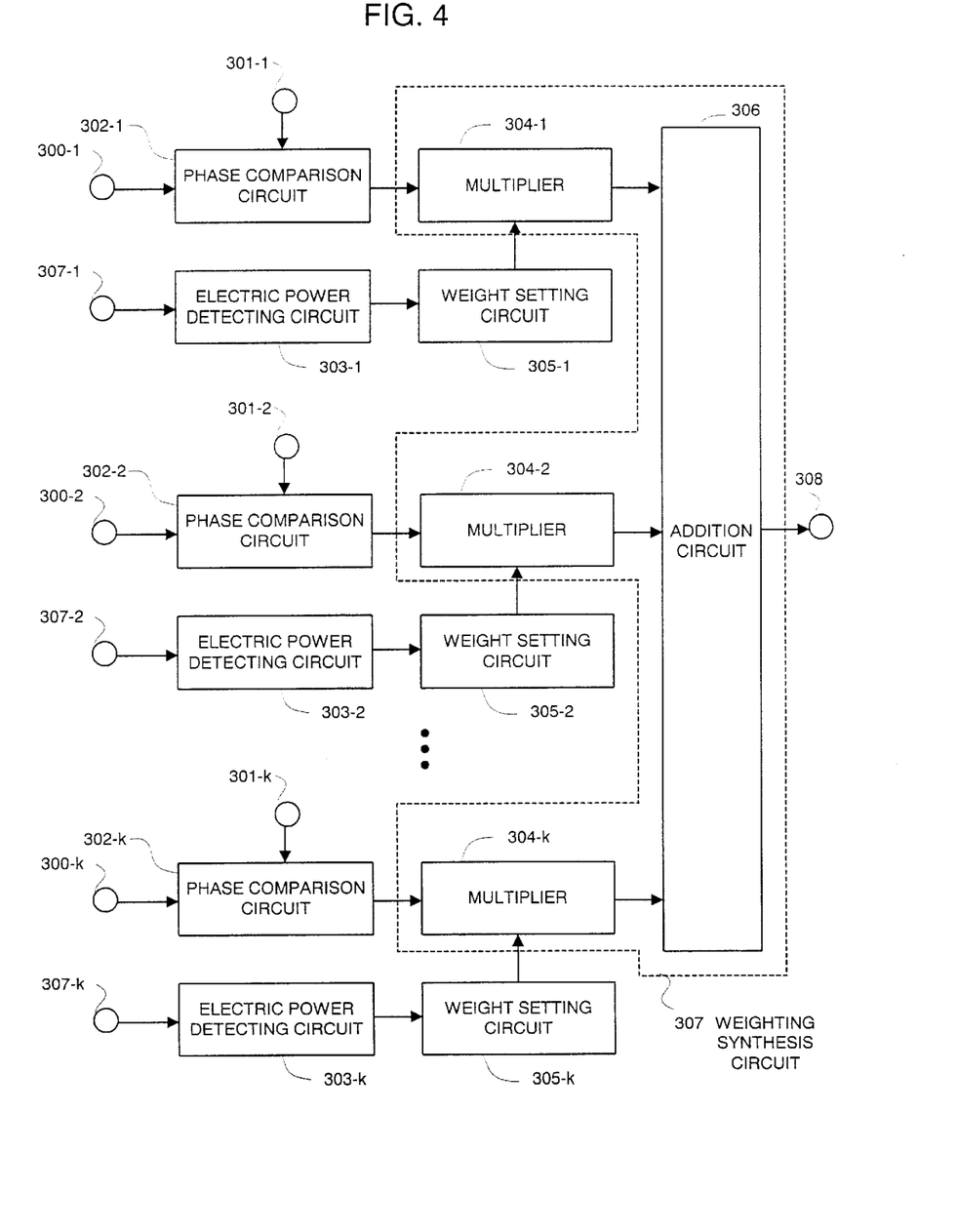
FIG. 4 is a block diagram showing an embodiment of the phase estimating circuit 103 in FIG. 1.

The phase estimating circuit 103 can be constructed as FIG. 4. In the figure, 300-1–300-k, 301-1–301-k and 307-1–307-k are input terminals, 302-1–302-k are phase comparison circuits, 303-1–303-k are electric power detecting circuits, 305-1–305-k are weight setting circuits, and 308 is an output terminal. Also, 307 is a weighting synthesis circuit, and it is constructed of multipliers 304-1–304-k and an addition circuit 306.

The carrier components S(I)–S(k) in which distortion is corrected are input to the input terminals 300-1–300-k, the signal points R(1)–R(k) corresponding to each of the sub-carrier components S(1)–S(k) are input to the input terminals 301-1–301-k, and the distortion correction coefficients C(1)–C(k) for each of the sub-carrier components S(1)–S(k) are input to the input terminals 307-1–307-k. The i-th ($1 \leq i \leq k$)) phase comparison circuit 302-i receives the signal point R(i) obtained by demodulating the i-th sub-carrier component S(i), and the i-th carrier component S(i) in which distortion is corrected, and outputs a phase difference therebetween. Also, the i-th electric power detecting circuit 303-i obtains electric power of the distortion correction coefficient C(i) for the i-th sub-carrier, and outputs it to the weight setting circuit 305-i. A group of the weight setting circuits 305-1–305-k obtain weights based on the distortion correction coefficient C(i) for the input i-th sub-carrier component S(i), respectively, and output them.

Figure 5:
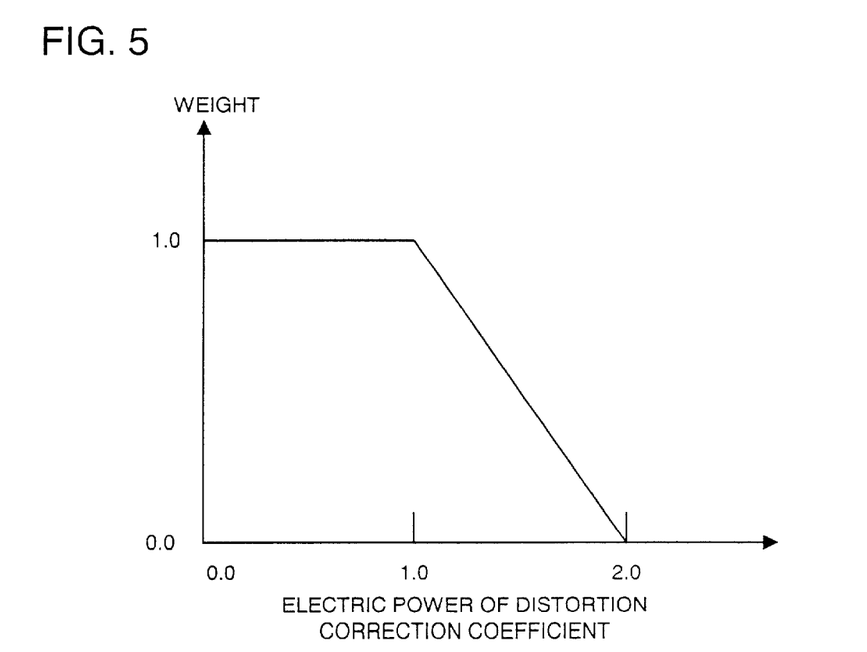
FIG. 5 is a view showing one example of input and output characteristic of a group of the weight setting circuits 305-1–305-k in FIG. 4.

With regard to input and output characteristic of the weight setting circuits, characteristic in FIG. 5 is used, for example. In other words, since reception electric power of a sub-carrier component in which an electric power value of a distortion correction coefficient is large is small, the reception electric power of the sub-carrier component is small, and a signal to noise ratio is also small. Accordingly, since there is a possibility that a noise largely affects a phase difference obtained from such a sub-carrier component, a weight is made to be small.

Figure 6:
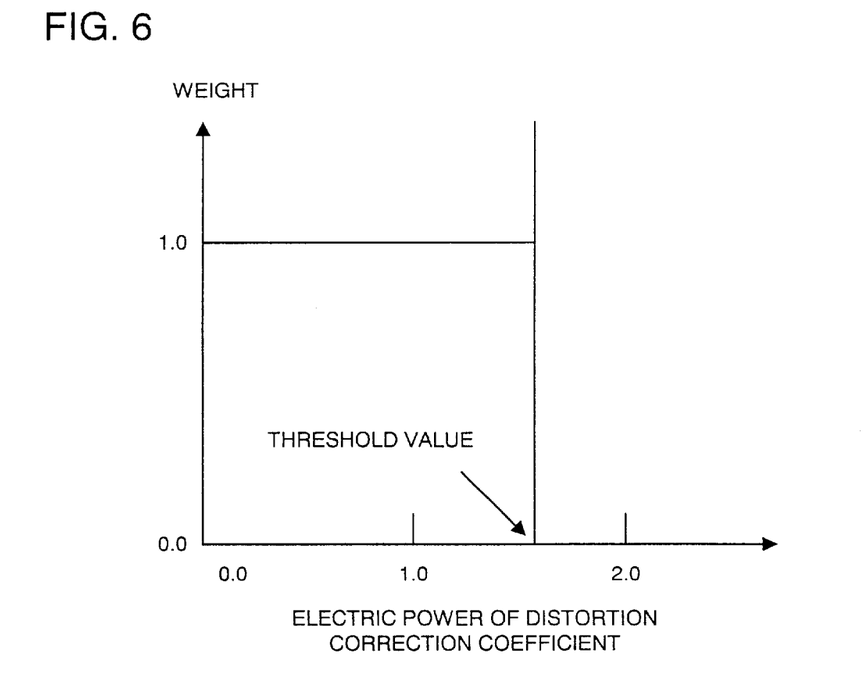
FIG. 6 is a view showing another example of input and output characteristic of a group of the weight setting circuits 305-1–305-k in FIG. 4.

Also, with regard to the input and output characteristic of the weight setting circuits, as shown in FIG. 6, by setting a threshold value, and conducting non-linear operation in which a weight is 0 in case that the threshold value is exceeded, and the weight is 1 in case that the threshold value is not exceeded, it is possible to reduce influence of a noise.

A weight coefficient for each carrier component, which is obtained in this manner, is multiplied by a phase difference obtained from each carrier component in the multipliers 304-1–304-k, and weighting synthesis is conducted by adding a result of the multiplication in the addition circuit 306, and a result thereof is output to the output terminal 308 as a phase error.

Although the above embodiment is shown as for a case in which all k sub-carriers are modulated by a transmission data, the present invention can be easily applied to a case in which a sub-carrier for a pilot signal, which is modulated at a predetermined signal point, is included. In other words, assuming that a sub-carrier for a pilot signal is the j-th sub-carrier, a predetermined signal point can be input, instead of a signal point R(j) obtained by demodulating the j-th sub-carrier component that is input from the input terminal 301-j.

Furthermore, although this embodiment shows a case in which the k sub-carriers are used, it is also possible to obtain a phase error from sub-carriers, of which number is arbitrary and less than or equal to k.

Figure 8:
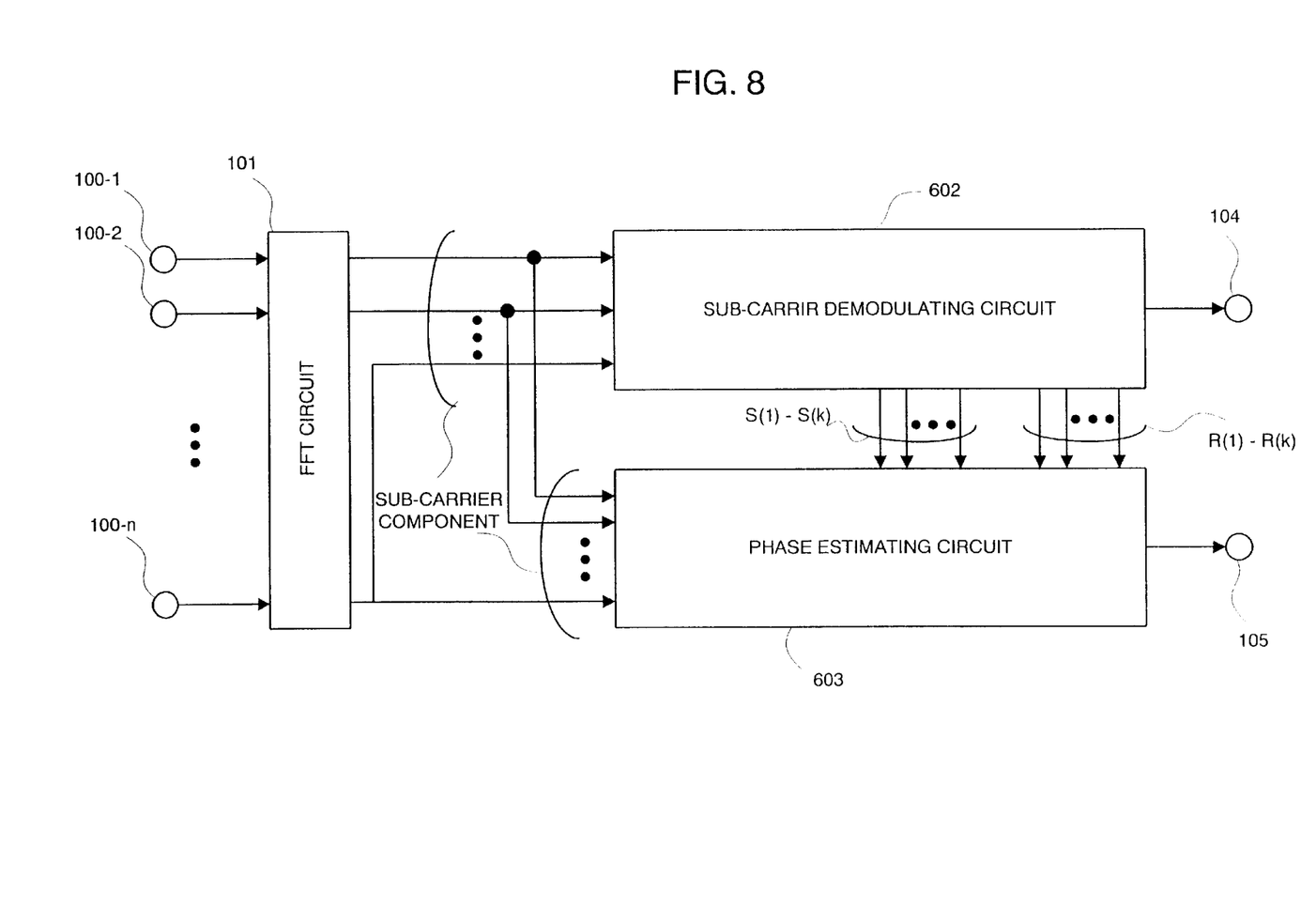
FIG. 8 is a block diagram showing an embodiment of a receiver of the second present invention.

Another embodiment of a receiver of the present invention will be explained using a block diagram of FIG. 8. In FIG. 8, 100-1–100-n are input terminals, 101 is a fast Fourier transform (FFT) circuit, 602 is a sub-carrier demodulating circuit circuit, 603 is a phase estimating circuit, and 104 and 105 are output terminals. Here, the input terminals 100-1–100-k, the FFT circuit 101, and the output terminals 104 and 105 are the same as those in FIG. 8. The k sub-carrier components output from the FFT circuit 101 are output to the sub-carrier demodulating circuit 602 and the phase estimating circuit 603. The sub-carrier demodulating circuit 602 demodulates the k sub-carrier components, and parallel/serial transform is applied to a transmitted information bit, and it is output to the output terminal 104.

Furthermore, the sub-carrier demodulating circuit 602 outputs determination signal points R(1)–R(k) for each sub-carrier and each of sub-carrier components S(1)–S(k) in which distortion is corrected to the phase estimating circuit 603. The phase estimating circuit 603 receives the determination signal points R(1)–R(k), and each of the sub-carrier components S(1)–S(k) in which distortion is corrected, which are obtained from the sub-carrier demodulating circuit 102, and receives the k sub-carrier components from the FFT circuit 101, and outputs a phase error signal to the output terminal 105. The phase error signal output to the output terminal 105 is integrated by a loop filter and so forth, and is fed back to a local oscillator, and thereby, phase tracking is realized.

Figure 9:
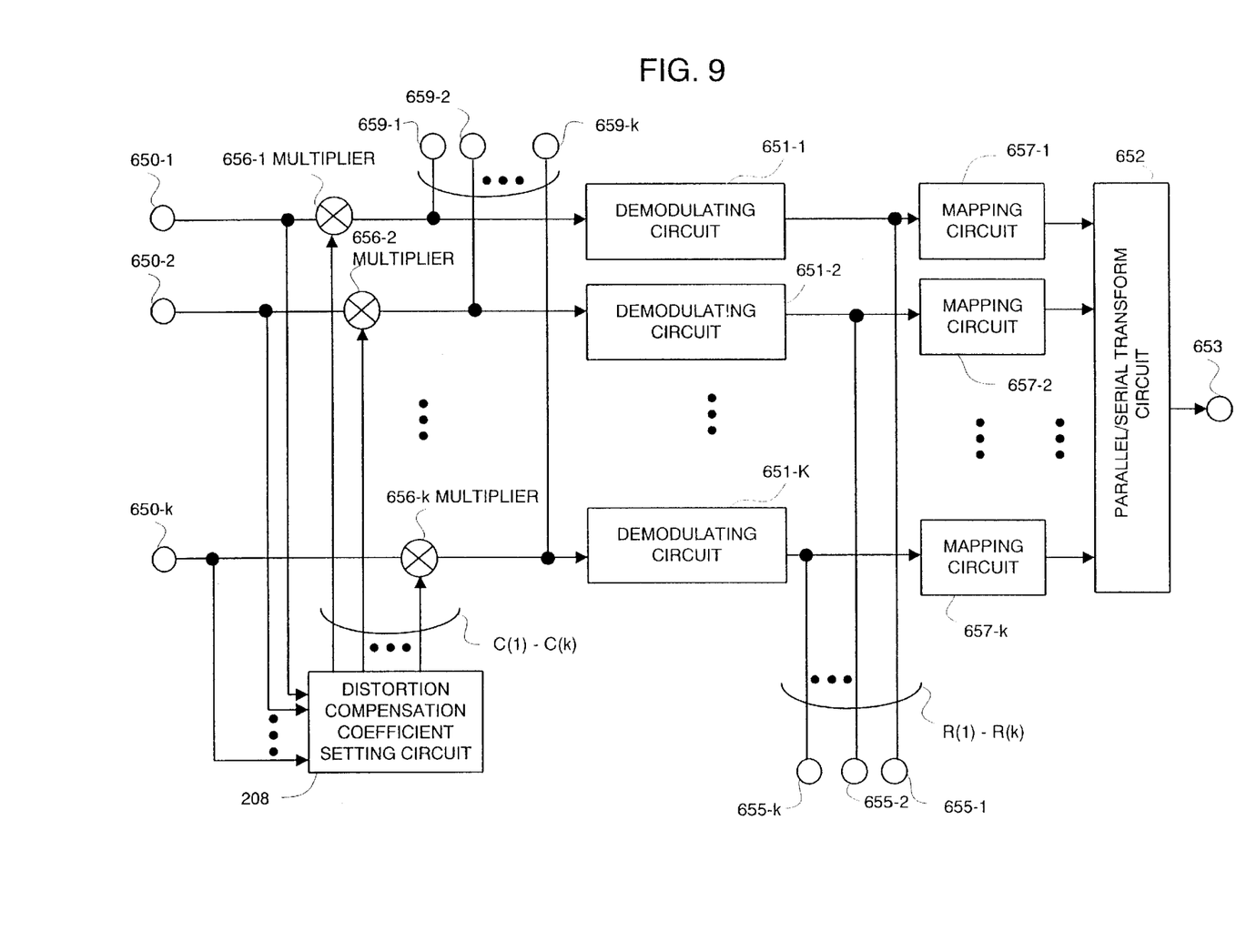
FIG. 9 is a block diagram showing an embodiment of the sub-carrier demodulating circuit 602 in FIG. 8.

The sub-carrier demodulating circuit 602 can be constructed as FIG. 9, for example. In FIG. 9, 650-1–650-k are input terminals, 651-1–651-k are demodulating circuits, 652 is a parallel-serial transform circuit, 656-1–656-k are multipliers, 657-1–657-k are mapping circuits, 208 is a distortion compensation coefficient setting circuit, and 653, and 655-1–655-k are output terminals. The k sub-carrier components output from the FFT circuit 101 are input to the input terminals 650-1–650-k.

Out of the packet of a format shown in FIG. 7, a part of the training signal 502 for communication line distortion estimation is input to the distortion compensation coefficient setting circuit 208, and the distortion compensation coefficients C(1)–C(k) for each sub-carrier are obtained. The same as that in FIG. 3 is used for the distortion compensation coefficient setting circuit 208. By means of the group of the multipliers 206-1–206-k, the distortion compensation coefficients C(1)–C(k) are multiplied by each sub-carrier which forms each symbol of the data symbols 503-1–503-M received after the distortion compensation coefficients C(1)–C(k) are obtained, and thereafter, the distortion compensation coefficients C(1)–C(k) are demodulated to any of the transmission signal points by a group of the demodulating circuits 651-1–651-k.

The signal points R(1)–R(k) corresponding to each sub-carrier component, which are output from the demodulating circuits 651-1–651-k, are output to a group of the output terminals 655-1–655-k, and also, to a group of the mapping circuits 657-1–657-k. The group of the mapping circuits 657-1–657-k apply mapping to the respective input signal points along a bit line corresponding to the signal points, and output them to the parallel-serial transform circuit 652. In the parallel/serial transform circuit 652, parallel/serial transform is applied to the bit line from the mapping circuits 657-1–657-k, and it is output to the output terminal 653 as a demodulation result.

Figure 10:
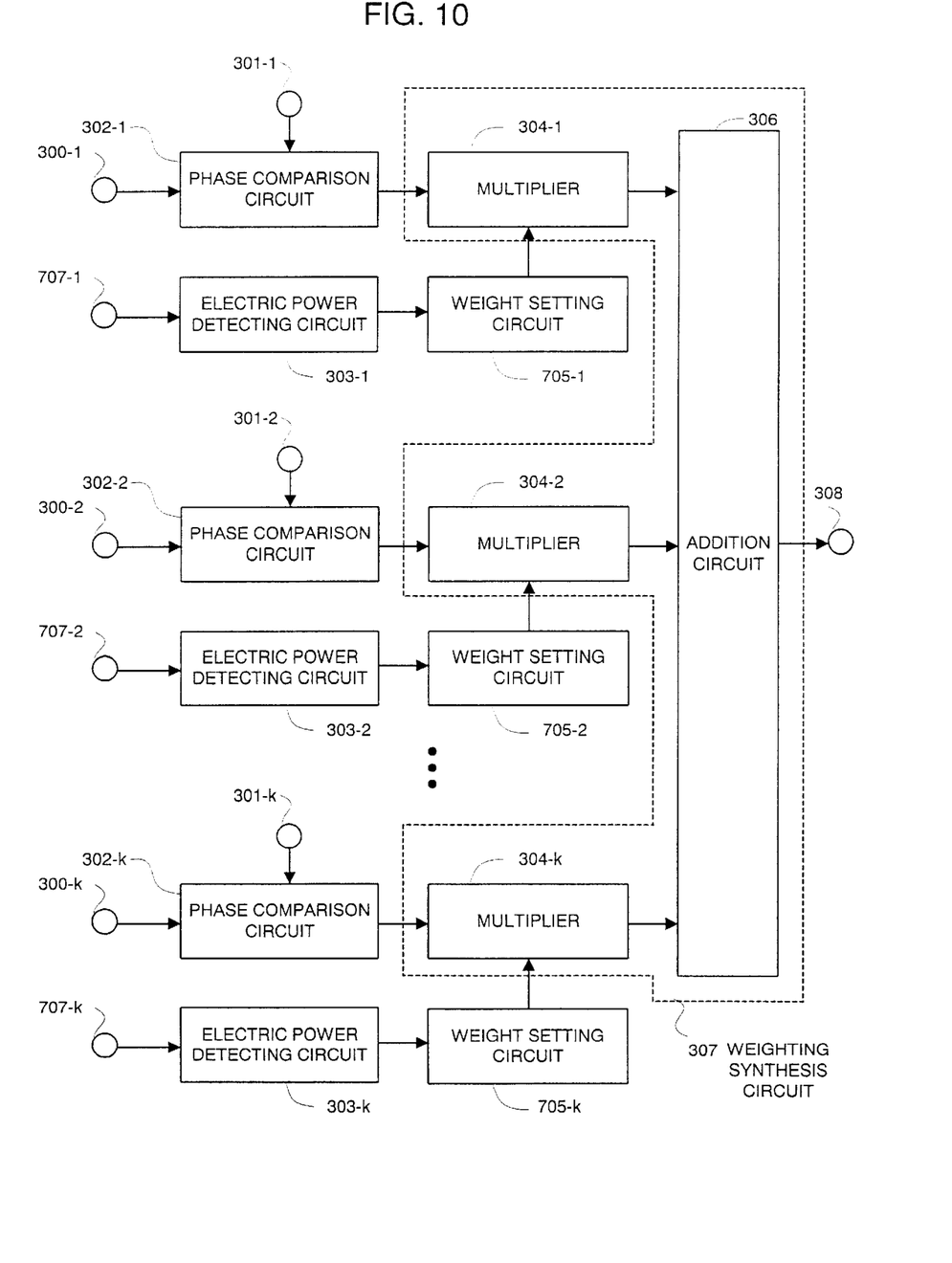
FIG. 10 is a block diagram showing an embodiment of the phase estimating circuit 603 in FIG. 8.
Figure 11:
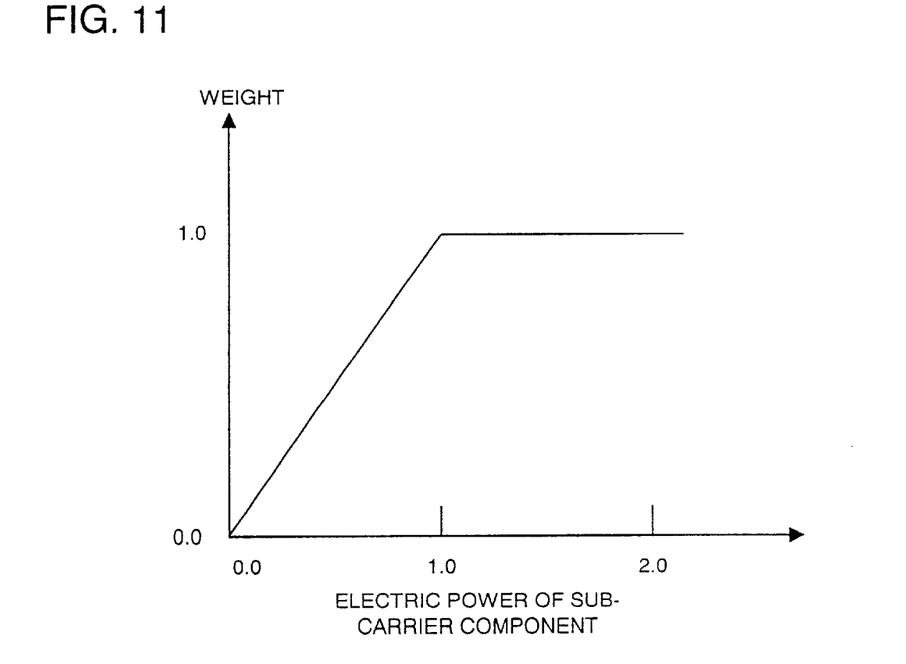
FIG. 11 is a view showing one example of input and output characteristic of a group of the weight setting circuits 705-1–705-k in FIG. 10.

The phase estimating circuit 603 in this embodiment can be constructed as FIG. 10. Points different from FIG. 4 are that an input to the electric power detecting circuits 303-1–303-k is not the distortion correction coefficients C(1)–C(k) for each sub-carrier, but the sub-carrier component obtained from the FFT circuit 101, and input and output characteristic of the weight setting circuits 705-1–705-k. Characteristic in FIG. 11 is desirable for the input and output characteristic of the weight setting circuits 705-1–705-k. In other words, since, when electric power of a sub-carrier component output from the FFT circuit 101 becomes to be smaller, influence due to a noise becomes to be larger, a weight of a phase difference obtained from the sub-carrier is made to be small, and since, when electric power of a sub-carrier component becomes to be larger, reliability becomes to be higher, the weight is made to be large.

Figure 12:
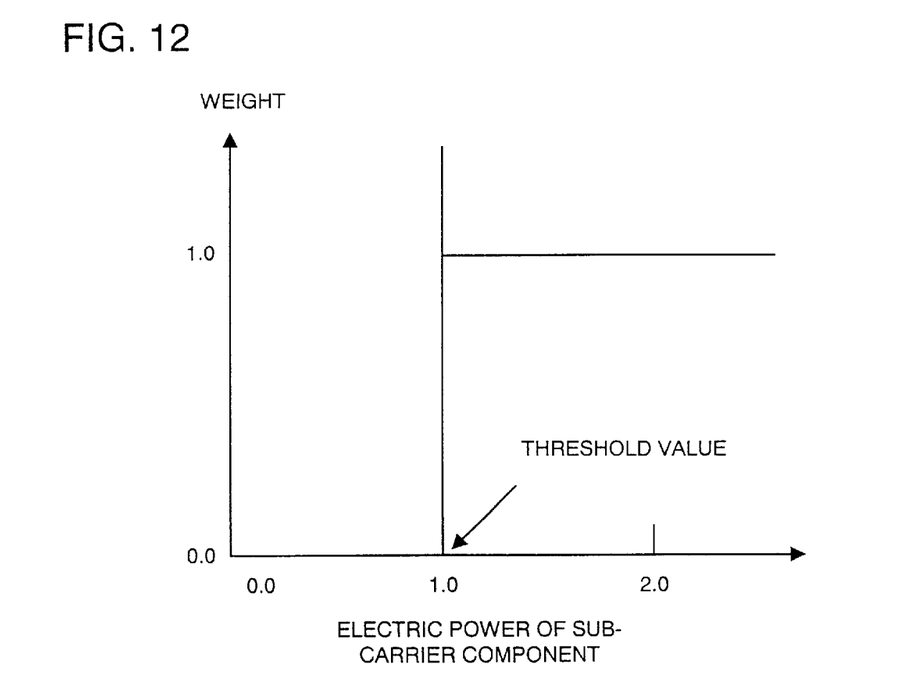
FIG. 12 is a view showing another example of input and output characteristic of a group of the weight setting circuits 705-1–705-k in FIG. 10

Also, with regard to the input and output characteristic of the weight setting circuits, as shown in FIG. 12, by setting a threshold value, and conducting non-linear operation in which a weight is 1 in case that the threshold value is exceeded, and the weight is 0 in case that the threshold value is not exceeded, it is possible to reduce influence of a noise.

Although the above embodiment is shown as for a case in which all k sub-carriers are modulated by a transmission data, the present invention can be easily applied to a case in which a sub-carrier for a pilot signal, which is modulated at a predetermined signal point, is included. In other words, assuming that a sub-carrier for a pilot signal is the j-th sub-carrier, the present invention can be applied by inputting a predetermined signal point, instead of a signal point R(j) obtained by demodulating the j-th sub-carrier component that is input from the input terminal 301-j.

Furthermore, although this embodiment shows a case in which the k sub-carriers are used, it is also possible to obtain a phase error from sub-carriers, of which number is arbitrary and less than or equal to k.

According to the present invention, in the receiver for receiving a signal such as an OFDM signal, in which a plurality of sub-carriers are multiplexed and which is transmitted, it becomes to be possible to conduct phase tracking with high accuracy.

What is claimed is:

1. A receiver for receiving a modulated wave for carrying data in which N sub-carriers are multiplexed, said receiver comprising:

a sub-carrier demodulating circuit for receiving a plurality of (k, $1 \leq k \leq N$) sub-carrier components which are multiplexed and de-multiplexed, and outputting a result of demodulating each of said sub-carrier components as a demodulation result of each of said plurality of sub-carrier components, and for conducting determination based on said demodulation result and outputting a determination result, and outputting a distortion correction coefficient for each of said plurality of sub-carrier components, and a value which is generated by correcting each of said plurality of sub-carrier components based on said distortion correction coefficient; and a phase estimating circuit for receiving the determination result of each of said plurality of sub-carrier components, the distortion correction coefficient for each of said plurality of sub-carrier components, and the value which is generated by correcting each of said plurality of sub-carrier components based on said distortion correction coefficient, and for outputting a phase error.

2. A receiver according to claim 1, wherein said phase estimating circuit comprises:

k phase comparison circuits for receiving the determination result of each of said plurality of sub-carrier components and the value which is generated by correcting each of said plurality of sub-carrier components based on said distortion correction coefficient, and for detecting a phase difference between said corresponding demodulation result and the value corrected based on said distortion correction coefficient, and outputting it as a phase difference of each sub-carrier;

k electric power detecting circuits for receiving the distortion correction coefficient for each of said plurality of sub-carrier components, detecting electric power of the distortion correction coefficient for each of said plurality of sub-carrier components, and outputting it as distortion correction coefficient electric power of each sub-carrier;

k weight setting circuits for receiving each distortion correction coefficient electric power of said each sub-carrier, and based on the distortion correction coefficient electric power of said each sub-carrier, for obtaining a weight for said each sub-carrier for weighting a phase difference of said each sub-carrier and conducting synthesis thereof, and outputting the weight; and a weighting and synthesizing circuit for outputting a result of weighting and synthesizing a phase difference of said each sub-carrier based on the weight for said each sub-carrier as a phase error.

3. A receiver according to claim 2, wherein said weight setting circuits comprise means for setting a weight to a first value if the distortion correction coefficient electric power of said each sub-carrier is smaller than a determined value, and setting a weight to a second value, smaller than the first value if the distortion correction coefficient electric power of said each sub-carrier is larger than the determined value.

4. A receiver according to claim 2, wherein said weight setting circuits comprise means for setting a weight to be 1 if the distortion correction coefficient electric power of said each sub-carrier is smaller than a determined threshold value, and for setting a weight to be 0 if the distortion correction coefficient electric power of said each sub-carrier is larger than a determined threshold value.

5. A receiver for receiving a modulated wave for transmitting data in which N sub-carriers are multiplexed, said receiver comprising:

a sub-carrier demodulating circuit for receiving a plurality of (k, $1 \leq k \leq N$) sub-carrier components which are multiplexed and de-multiplexed, and outputting a result of demodulating each of said sub-carrier components as a demodulation result of each of said plurality of sub-carrier components, and for conducting determination based on said demodulation result and outputting a determination result, and outputting a value which is obtained by correcting distortion generated in each of said plurality of sub-carrier components; and a phase estimating circuit for receiving the demodulation result of each of said plurality of sub-carrier components, the value which is obtained by correcting distortion generated in each of said plurality of sub-carrier components, and said plurality of sub-carrier components which are multiplexed and de-multiplexed, and for outputting a phase error.

6. A receiver according to claim 5, wherein said phase estimating circuit comprises:

k phase comparison circuits for receiving the determination result of each of said plurality of sub-carrier components and the value which is obtained by correcting distortion generated in each of said plurality of sub-carrier components, detecting said corresponding demodulation result and the value which is obtained by correcting distortion generated in each of said plurality of sub-carrier components, and outputting them as a phase difference of each sub-carrier;

k electric power detecting circuits for receiving said plurality of sub-carrier components which are multiplexed and de-multiplexed, detecting electric power of said plurality of sub-carrier components which are multiplexed and de-multiplexed, and outputting it as electric power of each sub-carrier component;

k weight setting circuits for receiving each electric power of said each sub-carrier component, and based on the electric power of said each sub-carrier component, for obtaining a weight for said each sub-carrier for weighting a phase difference of said each sub-carrier and conducting synthesis thereof, and outputting the weight; and a weighting and synthesizing circuit for outputting a result of weighting and synthesizing a phase difference of said each sub-carrier based on the weight for said each sub-carrier as a phase error.

7. A receiver according to claim 6, wherein said weight setting circuits comprise means for setting a weight to a first value if the electric power of said each sub-carrier component is smaller than a determined value, and for setting a weight to a second value, larger than the first value if the electric power of said each sub-carrier component is larger than the determined value.

8. A receiver according to claim 6, wherein said weight setting circuits comprise means for setting a weight to be 0 if the electric power of said each sub-carrier component is smaller than a determined threshold value, and for setting a weight to be 1 if the electric power of said each sub-carrier component is larger than a determined threshold value.

9. A receiving method of receiving a modulated wave for carrying a data in which N sub-carriers are multiplexed, said receiving method comprising:

receiving a plurality of (k, $1 \leq k \leq N$) sub-carrier components which are multiplexed and de-multiplexed, and outputting a result of demodulating each of said sub-carrier components as a demodulation result of each of said plurality of sub-carrier components, conducting determination based on said demodulation result and outputting a determination result, and outputting a distortion correction coefficient for each of said plurality of sub-carrier components, and a value which is generated by correcting each of said plurality of sub-carrier components based on said distortion correction coefficient; and estimating a phase error based on said determination result of each of said plurality of sub-carrier components, said distortion correction coefficient for each of said plurality of sub-carrier components and said value which is generated by correcting each of said plurality of sub-carrier components based on said distortion correction coefficient.

10. A receiving method according to claim 9, wherein said step of estimating a phase error comprises:

receiving the determination result of each of said plurality of sub-carrier components and the value which is generated by correcting each of said plurality of sub-carrier components based on said distortion correction coefficient, and for detecting a phase difference between said corresponding demodulation result and the value corrected based on said distortion correction coefficient, and outputting it as a phase difference of each sub-carrier;

receiving the distortion correction coefficient for each of said plurality of sub-carrier components, detecting electric power of the distortion correction coefficient for each of said plurality of sub-carrier components, and outputting it as distortion correction coefficient electric power of each sub-carrier;

receiving each distortion correction coefficient electric power of said each sub-carrier, and based on distortion correction coefficient electric power of said each sub-carrier, for obtaining a weight for said each sub-carrier for weighting a phase difference of said each sub-carrier and conducting synthesis thereof, and outputting the weight; and outputting a result of weighting and synthesizing a phase difference of said each sub-carrier based on the weight for said each sub-carrier as a phase error.

11. A receiving method according to claim 10, wherein said step of obtaining a weight sets a weight to a first value if the distortion correction coefficient electric power of said each sub-carrier is smaller than a determined value, and sets a weight to a second value, smaller than the first value if the distortion correction coefficient electric power of said each sub-carrier is larger than the determined value.

12. A receiving method according to claim 10, wherein said step of obtaining a weight sets a weight to be 1 if the distortion correction coefficient electric power of said each sub-carrier is smaller than a determined threshold value, and sets a weight to be 0 if the distortion correction coefficient electric power of said each sub-carrier is larger than a determined threshold value.

13. A receiving method of receiving a modulated wave for transmitting a data in which N sub-carriers are multiplexed, said receiving method comprising:

receiving a plurality of (k, 1≦k≦N) sub-carrier components which are multiplexed and de-multiplexed, and outputting a result of demodulating each of said sub-carrier components as a demodulation result of each of said plurality of sub-carrier components, conducting determination based on said demodulation result and outputting a determination result, and outputting a value which is obtained by correcting distortion generated in each of said plurality of sub-carrier components; and estimating a phase error based on said demodulation result of each of said plurality of sub-carrier components, said value which is obtained by correcting distortion generated in each of said plurality of sub-carrier components and said plurality of sub-carrier components which are multiplexed and de-multiplexed.

14. A receiving method according to claim 13, wherein said step of estimating phase error comprises:

receiving the determination result of each of said plurality of sub-carrier components and the value which is obtained by correcting distortion generated in each of said plurality of sub-carrier components, detecting said corresponding demodulation result and the value which is obtained by correcting distortion generated in each of said plurality of sub-carrier components, and outputting them as a phase difference of each sub-carrier;

receiving said plurality of sub-carrier components which are multiplexed and de-multiplexed, detecting electric power of said plurality of sub-carrier components which are multiplexed and de-multiplexed, and outputting it as electric power of each sub-carrier component;

receiving each electric power of said each sub-carrier component, and based on the electric power of said each sub-carrier component, for obtaining a weight for said each sub-carrier for weighting a phase difference of said each sub-carrier and conducting synthesis thereof, and outputting the weight; and outputting a result of weighting and synthesizing a phase difference of said each sub-carrier based on the weight for said each sub-carrier as a phase error.

15. A receiving method according to claim 14, wherein said step of obtaining a weight sets a weight to a first value if the electric power of said each sub-carrier component is smaller than a determined value, and sets a weight to a second value, larger than the first value if the electric power of said each sub-carrier component is larger than the determined value.

16. A receiving method according to claim 14, wherein said step of obtaining a weight sets a weight to be 0 if the electric power of said each sub-carrier component is smaller than a determined threshold value, and sets a weight to be 1 if the electric power of said each sub-carrier component is larger than a determined threshold value.

17. A receiver for receiving a modulated wave for carrying data in which sub-carriers are multiplexed, said receiver comprising:

a sub-carrier demodulating circuit for receiving one or more sub-carrier components, for conducting a determination based on a result of demodulating each of said one or more sub-carrier components, and outputting a determination result, and outputting a distortion correction coefficient for each of said one or more sub-carrier components, and a value generated by correcting each of said one or more sub-carrier components based on said distortion correction coefficient; and a phase estimating circuit for receiving the determination result of each of said one or more sub-carrier components, the distortion correction coefficient for each of said plurality of sub-carrier components, and the value which is generated by correcting each of said plurality of sub-carrier components based on said distortion correction coefficient, and for outputting a phase error.

* * * * *